No. 614,901.  
C. H. SHEPARD.  
TYPE WRITER SCALE.  
(Application filed June 8, 1897.)  
(No Model.)
Patented Nov. 29, 1898.
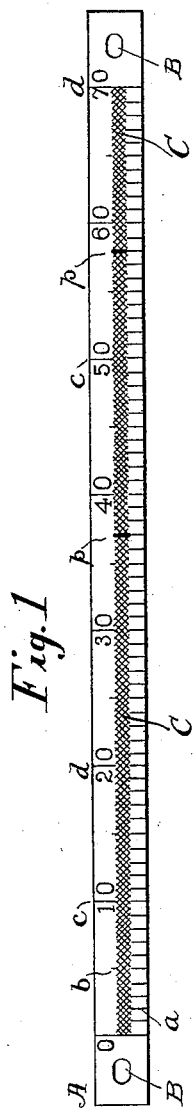
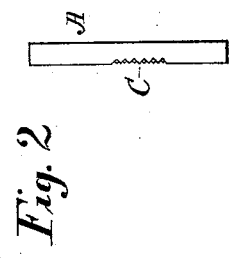
WITNESSES:  
K. V. Donovan.  
M. W. Pool.
INVENTOR  
Charles H. Shepard  
BY  
Jacob Felbel  
ATTORNEY.

UNITED STATES PATENT OFFICE.

CHARLES H. SHEPARD, OF NEW YORK, N. Y., ASSIGNOR TO THE WYCKOFF, SEAMANS & BENEDICT, OF ILION, NEW YORK.

TYPE-WRITER SCALE.

SPECIFICATION forming part of Letters Patent No. 614,901, dated November 29, 1898.

Application filed June 8, 1897. Serial No. 639,851. (No model.)

*To all whom it may concern:*

Be it known that I, CHARLES H. SHEPARD, a citizen of the United States, and a resident of New York, (Brooklyn,) in the county of Kings and State of New York, have invented certain new and useful Improvements in Type-Writer Scales, of which the following is a specification.

Previous to my invention numerous typewriter scales have been devised for the purpose of facilitating the performance of what is known as "tabular" work, in which the matter to be written or printed must be arranged in columns or some such manner, as in billwork, in insurance-tables, and the like.

My invention relates to type-writer scales of this description, and has for its main object to so construct the ordinary machine or carriage scale that it may be readily employed for tabular work, as well as for its ordinary purpose of denoting the progress and position of the carriage during the work of type-writing. To this end I provide the ordinary metallic scale with a milled, knurled, or suitably-roughened surface which is to be marked with a lead-pencil or crayon at desired points to guide or assist the operator in the performance of the tabular work in hand, as will now be more fully described in connection with the accompanying drawings, in which—

Figure 1 is a front elevation of a scale embodying my improvements, and Fig. 2 is an enlarged end sectional view of the same.

In both views the same part is designated by the same letter of reference.

A is a metallic or other plate or thin bar, which in the present instance is formed at its ends with slots B for its attachment either to the frame of a type-writing machine or to the carriage thereof by means of screws, as usual heretofore. This bar or plate is also shown as graduated in the customary manner from "0" to "70," being adapted for use in a machine in which the carriage makes seventy letter-space movements in its travel from the right-hand side to the left-hand side of the machine. There are seventy short lines $a$ perpendicular to the lower edge of the plate, and at each fifth such line there is a shorter line $b$ to facilitate the reading of the scale, and at each tenth subdivision of the scale or at each tenth short line $a$ is placed an additional short line $c$, and at these short lines $c$ are marked the numerals "10," "20," "30," "40," "50," "60," and "70" to further facilitate in the reading of the scale.

Extending longitudinally of the scale is a roughened surface, strip, or band C, which may be formed either by knurling or by milling the surface of the material of which the scale is composed. Preferably this roughened surface is arranged about the middle of the scale widthwise and occupies about one-third of its width; but this is not material as far as the main feature of my invention is concerned. However, by thus arranging the roughened surface the graduated lines $a$ may be arranged on one side of such surface, and the graduated lines $b$ and $c$ and the indicating-numerals $d$ may be disposed on the other side of such surface, which arrangement conduces to legibility of the scale.

By milling, knurling, or similarly operating upon the surface of the scale (preferably of metal) a series of fine points and depressions or cavities are thereby formed somewhat similar to those of a file, and the surface thus prepared is particularly well adapted to be marked by an ordinary lead-pencil, crayon, or the like, and when so marked to clearly disclose the same the projecting points of the abrading-surface operating apparently to break or wear off particles of the lead or marking material and the cavities to receive and hold the same, for when the roughened surface is marked with a pencil transversely, as indicated by the dotted lines $p$, such marking stands out clear and bold on the surface and is apparently continuous or unbroken across the same. The pencil-marks are more clearly distinguishable or stand out more prominently or perceptibly if the surface of the scale-plate be provided with a nickeled finish, as usual.

One great advantage of this construction of scale is that the pencil-marks may be instantaneously completely removed by means of an ordinary piece of soft rubber, such as is commonly found on the end of a lead-pencil, thus enabling the scale to be changed readily for different pieces or kinds of work.

In the use of the scale, suppose it be desired to commence a certain part of the work on each line of the page always at, say, "37" on the scale and another part of the work always at, say, "58" on the scale, the operator would then simply make pencil-marks $p$ in alinement with the thirty-seventh and fifty-eighth subdividing-marks $a$, which pencil-marks will then serve as guides or aids to the operator in the columnating or tabulating of the matter to be written. When this particular work is finished, the pencil-marks $p$ may be quickly erased and other marks applied at other portions of the roughened surface for doing other kinds or classes of work.

It is of course immaterial where the scale is placed—that is to say, whether it is fixed upon the machine-frame or upon the carriage. In some machines the scale is stationary and a pointer on the carriage travels over the scale, while in other machines the pointer is fixed and the scale on the carriage travels past the pointer, and it is of course immaterial whether the scale have seventy or a greater or lesser number of graduations.

It will be seen from the foregoing that by a simple and cheap expedient a scale is provided which may be readily employed for tabular work and that the construction is such that not only is the scale everlasting, but that it may be quickly prepared for tabular use by the operator by means of an ordinary lead-pencil, the markings or lines of which may be speedily removed with an ordinary piece of rubber when the same are no longer needed.

What I claim as new, and desire to secure by Letters Patent, is—

1. A type-writer scale provided with the usual graduations and having produced of the material of the scale a knurled or milled surface extending longitudinally of the scale and adapted to receive pencil-marks in alinement with said graduations.

2. A graduated metallic type-writer scale having a knurled or milled surface formed from the material of the scale and adapted to abrade and retain the material of a lead-pencil.

Signed at New York city, in the county of New York and State of New York, this 7th day of June, A. D. 1897.

CHARLES H. SHEPARD.

Witnesses:
K. V. DONOVAN,
JACOB FELBEL.